United States Patent Office 3,086,044
Patented Apr. 16, 1963

3,086,044
METHOD OF PREPARING COMPLEX DIESTERS OF A DIBASIC ACID WITH A DIOL AND AN EXCESS OF A MONOHYDRIC ALCOHOL
Paul M. Kerschner, Mercerville, N.J., and Bertrand W. Greenwald, Portland, Conn., assignors to Cities Service Research and Development Company, New York, N.Y., a corporation of New Jersey
No Drawing. Filed May 27, 1960, Ser. No. 32,079
10 Claims. (Cl. 260—485)

This invention relates to polyester compounds and more particularly relates to an improved method of preparing polyester compounds of controlled molecular weight viscosity.

This application is a continuation-in-part of our copending application Serial No. 671,152, filed July 11, 1957 and now abandoned.

The preparation of diester compounds by reacting a dibasic acid with an aliphatic diol is a reaction well known in the art. The compounds of such a reaction are generally of comparatively high molecular weight, of high viscosity, and low pour point making them ideally suited for use as synthetic lubricants. The range of such compounds suitable for lubricating purposes however is somewhat limited and accordingly the range of suitable reactants utilized in their preparation is likewise limited.

The most relevant prior art disclose relating to this subject is that of U.S. 2,628,974 wherein the preparation of polyester synthetic lubricants is disclosed. According to this teaching polyester lubricants may be prepared by reacting a glycol, a dibasic acid and a monohydric alcohol or a monocarboxylic acid. It is suggested therein that the properties of these polyesters can be modified by controlling the molar ratios of the dibasic acid and glycol used. It is further stated that to avoid an infinite chain length the acid glycol ratio must be kept higher than 1.1:1 and preferably above 1.25:1. If the molar ratio of acid to glycol is not so maintained, the molecular weight of the final product reaches extreme proportions. This undesirably high molecular weight coupled with high viscosity makes such reaction products unsuitable as synthetic lubricants.

According to the method of the present invention this undesirable result can be avoided. It has now been found quite unexpectedly that a large excess of a chain stopping monohydric alcohol, within specific limits, when added to the acid glycol mixture in a two stage reaction will prevent formation of polyesters of undesirably high molecular weight. More importantly however according to the method of the present invention it has been found that the molar ratio of acid to glycol can be reduced below the limit set in the prior art, to a value as low as 1.0:1 without the adverse effects suggested in the prior art.

It is accordingly an object of the present invention to provide an improved method of preparing polyesters of limited molecular weight and viscosity.

It is another object of the present invention to provide a method for limiting or controlling molecular weight of polyester synthetic lubricants even when diacid and diol reactants are used in a molar ratio of 1.0:1.

It is a further object of the present invention to provide polyester synthetic lubricants having molecular weight and viscosity characteristics within desired lubricating ranges.

A further advantage obtainable according to the method of the present invention is the ability to produce polyesters of desired characteristics utilizing the most inexpensive reactants. According to the prior art it might be necessary to use a molar ratio of acid to glycol of 2:1, whereas the method of this invention will provide a product of similar V.I. at a molar ratio of 1:1 merely by using an excess amount of the monohydric chain stopper.

These and other objects and advantages are obtained according to the method of the present invention by first reacting the diacid with a diol in the conventional manner and thereafter controlling molecular weight of the resulting polyester by utilizing in a second stage reaction a large excess of a chain stopping monohydric alcohol. The molar excess of the chain stopping monohydric alcohol required is at least 100% by volume.

According to this method of preparing comparatively high molecular weight polyesters it is possible to utilize smaller quantities of diacid since the reaction can be carried out at a molar ratio of diacid to diol of 1:1 without any adverse effect on the characteristics of the final product. In addition to reducing the quantities of diacid required, the addition of a substantial excess of chain stopping alcohol provides an unexpected but desirable reduction in molecular weight and viscosity of the final product.

The present invention is limited to conditions wherein the acid to glycol ratio is from 1.5:1 to 1:1 and preferably from 1.33:1 to 1:1. At higher acid to glycol ratios an excess of acid will be present in the reaction mixture. Accordingly, it should be recognized that the limitation and control of molecular weight and viscosity desired in the final ester as accomplished by the present invention can only be attained by the utilization of a molar excess of the monohydric chain terminating alcohol to the residual excess of unesterified acid remaining after the first stage reaction.

The dibasic acid utilized in preparing the polyester according to the method of the present invention may be any dibasic acid preferably of an aliphatic nature and containing 4 or more carbon atoms. Suitable polyesters can be formed according to the method of the present invention by utilizing dibasic acids having from 2 to 20 carbon atoms.

Generally speaking dibasic acids of intermediate molecular weight are preferred since they provide a more stable polyester. Suitable dibasic acids include ether dicarboxylic acids, thioether dicarboxylic acids and organo metallic dicarboxylic acids such as 4,4,6,6-tetramethyl-4,6-di-sila-5-oxanonanedioic acid. Some of the more typical dibasic acids which can be used are malonic, succinic, adipic, azelaic, sebacic, isosebacic, suberic, isosuberic, undecanedioic, dodecanedioic, tridecanedioic, tetradecanedioic, pentadecanedioic, hexadecanedioic, heptadecanedioic, octadecanedioic, nonadecanedioic and cosanedioc. If desired, aromatic dicarboxylic acids such as phthalic, terephthalic and metaphthalic acids can be used.

The diol utilized similarly covers a wide range of compounds included among which are common glycols. The diol selected should contain from 2 to about 30 carbon atoms and preferably between 2 and about 20 carbon atoms. Typical suitable glycols are ethylene glycol, diethylene glycol, and triethylene glycol and mixtures of such compounds.

Ether glycols such as dipropylene glycol, polypropylene glycol, polyethylene glycol, as well as thio ether glycols may be employed in the process of this invention. Dialcohols such as 1,3 butanediol, and 1,4 butanediol as well as other dihydric alcohols of suitable chain length can be used including 2,3 butanediol, 1,5 pentanediol, 1,6 hexanediol, 1,7 heptanediol, 1,8 octanediol, 1,9 nonanediol and 1,10 decanediol.

With respect to the chain stopping or chain terminating monohydric compound utilized, a monohydric aliphatic alcohol is preferred. This monofunctional compound advantageously contains at least 4 carbon atoms and may contain as many as 12 carbon atoms though lower molecular weight alcohols are preferred.

Typical alcohols such as methanol, butanol, propanol, 2-ethylbutanol, 2-ethylhexanol and mixtures of such compounds can be used. Other suitable alcohols include hexanol, heptanol, octanol, "oxo" alcohols, decanol, dodecanol, undecanol, isopropyl, isoamyl, isobutyl, 2-methylpentanol, 2-methyloctanol, 3-methyl, 2,2-dimethylpentanol, 2,2-dimethyloctanol and 2,2,4-trimethylpentanol. As has been previously indicated, the desired limitation of V.I. and molecular weight of the polyester is obtained by using a monohydric alcohol and not, for example, a monocarboxylic acid such as taught in prior art. The alcohol selected may be of straight or branched chain configuration and is preferably saturated.

When preparing polyesters by the esterification of a dibasic acid and a diol, a single stage is often used in which the chain stopping monohydric compound is added directly to the reactant mixture of diacid and diol. According to the method of the present invention however a two stage esterification is required in which the dibasic acid and diol in a predetermined molar ratio are first reacted in the presence of a catalyst, such as p-tolene sulfonic acid, trichloroacetic, beta naphthalene sulfuric, hydrochloric and concentrated sulfonic acid. Thereafter the polyester product of this reaction is further reacted with an excess of the monohydric chain stopping alcohol. In preparing polyesters according to this method the acid and diol are heated in a solvent such as benzene, toluene, xylene or the like, which solvent serves to form an azeotrope so that water of esterification may be removed from the reaction zone. To accomplish this, the reactants are heated under reflux in a 3-necked round bottom flask equipped with a mechanical stirrer, thermometer and a condenser fitted with a water trap. Reflux is carried out at the temperature of the azeotrope formed and will of course depend on the particular solvent selected. When water of esterification is no longer being formed as indicated by a rise in reaction temperature and a clear, water free distillate is collected in the water trap the first stage of the reaction is complete. At this point a sample of the reaction mixture is taken and the amount of free or unesterified acidity is determined. This is accomplished by any conventional acid equivalent determination such as for example by titration with a standard KOH solution. The total equivalents of acid remaining in the reaction mixture is based on this value. Knowing this value the amount of monoalcohol necessary for the second stage reaction can then be determined in the manner shown in the examples which follow.

It is with the latter reaction, that is the second stage esterification, that this invention is particularly concerned since as has been previously described it is the addition of an excess amount of the chain stopper over and above the amount necessary to terminate which unexpectedly provides the means by which viscosity and molecular weight control is accomplished.

This result follows even at molecular ratios of dibasic acid to diol as low as 1.0:1. This is accomplished by adding chain terminator in amounts above 100% excess of that amount of terminator necessary to react with the residual acid equivalents, particularly when molar ratios of 1.0:1 of reactants are used. There is no upper limit on the amount of excess terminator that may be used other than the economies of the process. As described hereafter as much as 6400% excess of terminator (molar ratio of 1.0:1) has been used.

The method of the present invention and the results obtainable therefrom will be more readily apparent from the examples and data which follow. In these examples, with the exception of Examples 1, 2, 9 and 10 which are used for comparative purposes, the amount of monoalcohol used in chain termination for molecular weight and viscosity control is based on the residual acidity at the end of the initial reaction step as has been previously explained. This can be calculated as follows:

Total residual equivalent of acid=(acid value[1])

[1] Acid value=mg. KOH to neutralize one gram of sample.

(grams of sample) (0.001) divided by mol wt. of KOH or percent excess alcohol $$= \frac{A-B}{B} \times 100$$

in which A=equivalents of monoalcohol added to reaction mixture for step 2 and B=equivalents of monoalcohol equal to the number of equivalents of free acid remaining after step 1.

EXAMPLE 1

94 g. of azelaic acid (0.5 mol) and 46.2 g. of diethylene glycol (0.435 mol) were placed in a 2-liter, 3-necked round bottom reaction flask equipped with a mechanical stirrer, a thermometer and a reflux condenser fitted with a water trap. 250 g. of toluene was added to the reaction mixture together with 1 g. p-toluene sulfonic acid. The mixture was heated under reflux until the temperature had risen to 110° C. and no further water was being received in the water trap. A sample was taken and it was determined that there remained in the reaction mixture 0.13 mol excess of unesterified acid.

To the reaction mixture there was then added 16.8 g. (0.130 mol) of 2-ethylhexanol, this amount of 2-ethylhexanol representing a 0% excess of the alcohol over unesterified acid. The reaction mixture was again refluxed until no further water was recovered in the water trap. Reflux was continued until the neutralization number of the mixture was found to be less than 4.

The reaction mixture was then washed with water, washed with 10% sodium carbonate and again washed with water to remove unreacted acid and catalyst. The washed product was distilled at a reduced pressure of 100 to 200 mm. to remove excess butanol and solvent. The reaction product analyzed as shown in Table 1, Example 1.

EXAMPLE 2

101.0 g. of sebasic acid (0.5 mol) was reacted with 35.3 g. diethylene glycol (0.333 mol) by being placed in a 2-liter, 3-necked round bottom reaction flask equipped with a mechanical stirrer, a thermometer and a reflux condenser fitted with a water trap. 215 g. toluene was added, along with 1.0 g. p-toluene sulfonic acid. The reaction mixture was heated under reflux for a period of about four hours at which time the reaction mixture had risen to a temperature of about 110° C. and no further water was being recovered in the water trap. At this time there remained 0.167 mol or .333 equivalents of unreacted acid requiring .333 mol of terminating alcohol to esterify the same.

To the reaction mixture 40.0 g. (.54 mol) of n-butanol, a 63% excess was added. Reflux was again carried out until no further water was recovered in the water trap.

After esterification was completed the reaction mixture was washed with water, washed with 10% sodium carbonate and again washed with water to remove unreacted acid and catalyst. The washed product was then distilled at reduced pressure to remove excess butanol and solvent. The distillation pot temperature was then raised to 173° C. and a pressure of 1.6 mm. of mercury to insure complete removal of excess alcohol and solvent. The final polyester product analyzed as shown in Table 1.

EXAMPLE 3

In a manner similar to that described in Examples 1 and 2, 101.0 g. of sebacic acid (.5 mol) was reacted with 39.9 g. diethylene glycol (.378 mol). 215.0 g. of toluene was added together with 1.0 g. p-toluene sulfonic acid. Acid remaining unesterified was determined to be 0.122 mol equivalent to 0.244 mol of monoacid, the latter requiring an equivalent amount of terminating alcohol to esterify the same.

After esterification was completed 45.0 g. (.61 mol, 150%) excess of n-butanol was added and the mixture refluxed further until the theoretical amount of esterification water was collected.

The product was then washed with water, washed with 10% sodium carbonate and finally washed with water again to remove unreacted acid and catalyst. The final product analyzed as shown in Table 1.

EXAMPLE 4

In a similar manner 101.0 g. of sebacic acid (.5 mol) was reacted with 39.9 g. (.378 mol) diethylene glycol. 215 g. of toluene was added to the reaction zone together with 1.0 g. p-toluene sulfonic acid.

After esterification of the acid was substantially complete 120 g. (1.62 mols, 563% excess) of n-butanol was added and reflux again conducted. The properties of the final reaction product are set forth in Table 1.

EXAMPLE 5

To 94.0 g. of azelaic acid (.5 mol), 21.0 g. ethylene glycol (.33 mol) was added together with 1.0 g. of p-toluene sulfonic acid and 215 g. of toluene. To the product obtained by esterification of the foregoing reactants 61.0 g. (.82 mol, 148% excess) n-butanol was added. Reflux of this mixture was continued until esterification was completed. Analysis of the product is provided in Table 1.

EXAMPLE 6

In a like manner 117.5 g. (.625 mol) of azelaic acid was esterified with 31.0 g. (0.50 mol) of ethylene glycol. 70.5 g. (.95 mol, 280% excess) of n-butanol was used as chain terminator. The analysis of this product is found in Table 1, Example 6.

EXAMPLE 7

To prepare the product identified as Example 7 in Table 1, 94.0 g. azelaic acid (0.5 mol) was esterified with 27.0 g. (.435 mol) of ethylene glycol. 40 g. (.54 mol, 315% excess) n-butanol was used as chain stopper.

EXAMPLE 8

In a manner similar to that described in previous examples 94.0 g. (.5 mol) azelaic acid was esterified with 46.2 g. (.435 mol) diethylene glycol. 33.8 g. (.26 mol, 100% excess) of 2-ethylhexanol was used as a chain stopper. The effect of the 100% excess of chain stopper is set forth in Table 1.

EXAMPLE 9

To 101.0 g. (.5 mol) of sebacic acid, 39.9 g. (.375 mol) diethylene glycol was added in the presence of a small amount of catalyst, 215.0 g. of toluene and 33 g. (.254 mol, 4% excess) of 2-ethylhexanol was added as chain stopper.

EXAMPLE 10

To 94 g. (0.5 mol) azelaic acid 31 g. (0.5 mol) of ethylene glycol was added together with solvent and catalyst. Esterification of the acid was carried out at a temperature of 84.7° C. After a four hour period of reflux the temperature rose to about 110° C. and no further water was recovered. A sample of the reaction mixture was taken and it was determined that the mixture contained 0.167 equivalents of unesterified acid. To complete esterification it was necessary to add 0.167 mol or 12.4 g. of n-butanol. The molecular weight and viscosity of this product is shown in Table 1 for Example 10.

To demonstrate the effect of excess amounts of chain stopper a similar polyester was prepared with identical reactants in like amounts. In this instance an excess amount of chain stopper over and above the equivalent required to esterify terminal acid specifically 74.4 g. of n-butanol (a 500% excess) was added. The molecular weight of this compound is shown in Table 1 under Example 11.

The effectiveness of the method of the present invention in providing polyesters of limited molecular weight and viscosity will be more readily apparent from the data provided in Table 1. These data are based on an analysis of the products of the foregoing examples and demonstrate the effect on molecular weight and viscosity of adding excess chain stopper to the polyester product obtained by reacting a diacid and diol under the condition previously described.

*Table 1*

ANALYSIS OF ALIPHATIC POLYESTER TYPE LUBRICANTS

| Example No. | 1 | 2 | 3 | 4 |
|---|---|---|---|---|
| Dibasic acid | Azelaic | Sebacic | Sebacic | Sebacic. |
| Dialcohol | Diethylene glycol | Diethylene glycol | Diethylene glycol | Diethylene glycol. |
| Ratio, acid: diol | 1.15:1 | 1.5:1 | 1.33:1 | 1.33:1. |
| Chain terminator | n-Butanol | n-Butanol | n-Butanol | n-Butanol. |
| Percent excess | 0 | 63 | 150 | 575. |
| Mol. weight (calc.) | 858 | 858 | 1,130 | 1,242. |
| Mol. weight (found) | | 518 | 498 | 438. |
| Vis. at 100° F., cs | 499.5 | 42.75 | 37.40 | 20.80. |
| Vis. at 210° F., cs | 270.0 | 18.90 | 7.70 | 4.58. |
| Viscosity index | 129.0 | 169 | 146 | 155. |

| Example No. | 5 | 6 | 7 | 8 |
|---|---|---|---|---|
| Dibasic acid | Azelaic | Azelaic | Azelaic | Azelaic. |
| Dialcohol | Ethylene glycol | Ethylene glycol | Ethylene glycol | Diethylene glycol. |
| Ratio, acid: diol | 1.5:1 | 1.25:1 | 1.15:1 | 1.15:1. |
| Chain terminator | n-Butanol | n-Butanol | n-Butanol | 2-Ethylhexanol. |
| Percent excess | 140 | 280 | 315 | 100. |
| Mol. weight (Calc.) | 728 | 1,156 | 1,898 | 2,218. |
| Mol weight (found) | 381 | 410 | 505 | 800. |
| Vis. at 100° F., cs | 14.58 | 23.18 | 39.15 | 143.0. |
| Vis. at 210° F., cs | 3.80 | 5.24 | 7.87 | 21.0. |
| Viscosity index | 176 | 164 | 153 | 137. |

| Example No. | 9 | 10 | 11 |
|---|---|---|---|
| Dibasic acid | Sebacic | Azelaic | Azelaic. |
| Dialcohol | Diethylene glycol | Ethylene glycol | Ethylene glycol. |
| Ratio, acid: diol | 1.33:10 | 1:1 | 1:1. |
| Chain terminator | 2-ethylhexanol | n-Butanol | n-Butanol. |
| Percent excess | 4 | No excess | 500. |
| Mol. weight (calc.) | 1,242 | | |
| Mol. weight (found) | 926 | 1,327±20 | 441±5. |
| Vis. at 100° F., cs | 208.95 | 356.2 | 23.10. |
| Vis. at 210° F., cs | 29.46 | 41.5 | 5.25. |
| Viscosity index | 146 | 153 | 165. |
| Flash point, ° F | 565 | 595 | |
| Fire point, ° F | 605 | 685 | |

Referring now to the table it will be noted that as the excess amount of chain stopper is increased the molecular weight decreases. Simultaneously the viscosity of the final product also decreases. This will be seen from a comparison of Examples 4 and 9. In Example 9 a 4% excess of 2-ethylhexanol was used. The molecular weight found was 926 and the viscosity of the product at 100° F. was 208.95. The product of Example 4 however prepared by using an excess of 575% of the 2-ethylhexanol had a molecular weight of 438 and a viscosity at 100° F. of 20.8.

In a similar manner a comparison can be made between Examples 10 and 11 wherein the ratio of acid to diol was maintained at 1:1. In Example 10 no excess butanol chain stopper was used. The molecular weight of the polyester product was 1327. This result is to be contrasted with that of Example 11 in which a 500% excess of butanol was used at the same acid-diol ratio to produce a polyester product having a molecular weight of 441. A comparison should also be drawn between the viscosity of these two products namely 356.2 (at 100° F.) for the product of Example 10 compared to the viscosity of 23.10 (at 100° F.) for the product of Example 11. The latter of course is within the range of suitable lubricants.

To further demonstrate the effect of adding excess alcohol and the unique result obtained thereby, a further polyester preparation was carried out in which 6400% excess of alcohol was used with the product being analyzed before and after use of this excess amount. This preparation was carried out as follows:

448 g. (2.22 mols) of sebacic acid, 231 g. (2.22 mols) of neopentyl glycol, 511 ml. of toluene and 2 g. of p-toluene sulfonic acid were placed in a 4 necked, 5 liter round bottom flask, equipped with a stirrer, thermometer and a condenser attached to a water trap. The reactants were heated under reflux at a temperature of about 84° C. for a period of approximately 6 hours. After this time the temperature in the reaction zone had increased to 110° C. and no further water was collected in the trap. From a sample taken and treated with standardized KOH solution it was determined that 0.1288 equivalent of unesterified acid remained. To the reaction mixture 370.5 g. (2.85 mols, approximately 1000% excess) of 2-ethylhexanol was added. Reflux was again carried out for an additional 12 hour period. Excess alcohol and solvent were then removed from the reaction mixture under a vacuum of from 2 to 10 mm. The ester product was transferred to a molecular still and product recovered under extreme vacuum conditions. 231 g. of polyester boiling over a temperature range of from 100° C. at 200 microns to 330° C. at 100 microns was recovered. Approximately 340 g. of a viscous residue remained representing ⅔ of the total product. To increase total yield the residue was transferred to a reaction flask and residual unesterified acid determined to be 0.0103 equivalent of acid remaining. 83 g. (6400% excess—0.64 mol) of 2 ethylhexanol were added and reflux continued for 5 hours. Excess alcohol was removed and the product distilled in a molecular still under vacuum. An additional 295 g. of material boiling between 100° C. at 40 microns and 400° C. at 50 microns were recovered. The polyester product had the following physical properties:

| | |
|---|---|
| Hydroxyl No | 67.2. |
| Neutralization No | 1.24. |
| Vis. at 100° F | 87.71 cs. |
| Vis. at 210° F | 12.06 cs. |
| VI | 127. |
| Pour point | −40° F. |

As will be apparent the addition of excess monoalcohol to the residue of the initial recovery step changed the product residue from a heavy viscous material boiling in excess of 300° C. at 100 microns to a product which had a viscosity of 87.71 cs. at 100° F. and distilled over a temperature range of from 100° C. to 300° C. at 50 microns.

From the foregoing data and discussion it is believed apparent that the preparation of polyesters having properties particularly suitable for lubricating purposes has distinct advantage over prior methods of preparation. The ability to tailor polyester synthetic lubricants of specific characteristics within rather narrow limits and at a minimum expenditure of reactant materials offers a distinct advantage oves presently available methods.

Obviously modifications and changes of this invention may be made without departing from the scope hereof. Only such limitations should be imposed on this invention as are required by the claims appended hereto:

We claim:

1. In a method of preparing synthetic lubricants wherein a diacid of not more than 20 carbon atoms selected from the group consisting of aliphatic, ether, thioether and organometallic diacids, is reacted with a diol of from 2 to 20 carbon atoms selected from the group consisting of aliphatic, ether and thioether diols, in a molar ratio of from 1.5:1 to 1:1, and that reaction product is reacted with a chain terminating aliphatic monoalcohol of from 2 to 20 carbon atoms, the improvement comprising using an amount of monoalcohol in the second reaction which is at least 100% greater than that amount of monoalcohol required to react with all the residual acid groups present in the diacid-diol product.

2. In a method of preparing synthetic lubricants wherein a diacid of not more than 20 carbon atoms selected from the group consisting of aliphatic, ether, thioether and organometallic diacids, is reacted with a diol of from 2 to 20 carbon atoms selected from the group consisting of aliphatic, ether and thioether diols, in a molar ratio of from 1.25:1 to 1:1, and that reaction product is reacted with a chain terminating aliphatic monoalcohol of from 2 to 20 carbon atoms, the improvement comprising using an amount of monoalcohol in the second reaction which is at least 100% greater than that amount of monoalcohol required to react with all the residual acid groups present in the diacid-diol product.

3. In a method of preparing synthetic lubricants wherein a diacid of not more than 20 carbon atoms selected from the group consisting of aliphatic, ether, thioether and organometallic diacids, is reacted with a diol of from 2 to 20 carbon atoms selected from the group consisting of aliphatic, ether and thioether diols, in a molar ratio of from 1.25:1 to 1:1, and that reaction product is reacted with a chain terminating aliphatic monoalcohol of from 2 to 20 carbon atoms, the improvement comprising using an amount of monoalcohol in the second reaction which is from 100% to 6400% greater than that amount of monoalcohol required to react with all the residual acid groups present in the diacid-diol product.

4. In a method of preparing synthetic lubricants wherein an aliphatic diacid of not more than 20 carbon atoms from the group consisting of aliphatic, ether, thioether, and organometallic diacids, is reacted with a diol of from 2 to 20 carbon atoms selected from the group consisting of aliphatic, ether and thioether diols, in a molar ratio of from 1.5:1 to 1:1, and that reaction product is reacted with a chain terminating aliphatic monoalcohol of from 2 to 20 carbon atoms, the improvement comprising using an amount of monoalcohol in the second reaction which is from 100% to 6400% greater than that amount of monoalcohol required to react with all the residual acid groups present in the diacid-diol product.

5. In a method of preparing synthetic lubricants wherein an aliphatic diacid of not more than 20 carbon atoms is reacted with an aliphatic diol of from 2 to 20 carbon atoms in a molar ratio of from 1.25:1 to 1:1, and that reaction product is reacted with a chain terminating aliphatic monoalcohol of from 2 to 20 carbon atoms, the improvement comprising using an amount of monoalcohol in the second reaction which is from 100% to 6400% greater than that amount of monoalcohol required to react with all the residual acid groups present in the diacid-diol product.

6. In a method of preparing synthetic lubricants wherein azelaic acid is reacted with diethylene glycol in a molar ratio of from 1.5:1 to 1:1, and that reaction product is reacted with a chain terminating amount of 2-ethylhexanol in the second reaction which is at least 100% greater than that amount of monoalcohol required to react with all the residual acid groups present in the diacid-diol product.

7. In a method of preparing synthetic lubricants wherein sebacic acid is reacted with diethylene glycol in a molar ratio of from 1.33:1 to 1:1, and that reaction product is reacted with a chain terminating amount of n-butanol, the improvement comprising using an amount of n-butanol in the second reaction which is from 100% to 200% greater than that amount of n-butanol required to react with all the unreacted acid groups present in the diacid-diol product.

8. In a method of preparing a synthetic lubricant wherein azelaic acid is reacted with ethylene glycol in a molar ratio of 1:1 and that reaction product is reacted with a chain terminating amount of n-butanol, the improvement comprising using an amount of n-butanol in the second reaction which is 500% greater than that amount of n-butanol required to react with all the residual acid groups present in the diacid-diol product.

9. In a method of preparing a synthetic lubricant wherein sebacic acid is reacted with diethylene glycol in a molar ratio of 1.33:1 and that reaction product is reacted with a chain terminating amount of n-butanol, the improvement comprising using an amount of n-butanol in the second reaction which is 575% greater than that amount of n-butanol required to react with all the residual acid groups present in the diacid-diol product.

10. In a method of preparing a synthetic lubricant wherein azelaic acid is reacted with ethylene glycol in a molar ratio of 1.25:1 and that reaction product is reacted with a chain terminating amount of n-butanol, the improvement comprising using an amount of n-butanol in the second reaction which is 280% greater than that amount of n-butanol required to react with all the residual acid groups present in the diacid-diol product.

References Cited in the file of this patent

UNITED STATES PATENTS

| 2,628,974 | Sanderson | Feb. 17, 1953 |
| 2,666,781 | Ford | Jan. 19, 1954 |

FOREIGN PATENTS

| 566,519 | Germany | Dec. 17, 1932 |

UNITED STATES PATENT OFFICE
CERTIFICATE OF CORRECTION

Patent No. 3,086,044                                  April 16, 1963

Paul M. Kerschner et al.

It is hereby certified that error appears in the above numbered patent requiring correction and that the said Letters Patent should read as corrected below.

Column 1, line 13, after "weight" insert -- and --; line 26, for "disclose" read -- disclosure --; column 3, line 19, for "p-tolene" read -- p-toluene --; column 8, line 10, for "oves" read -- over --; line 56, after "atoms" insert -- selected --.

Signed and sealed this 5th day of November 1963.

(SEAL)
Attest:

ERNEST W. SWIDER                                EDWIN L. REYNOLDS

Attesting Officer                                  Acting Commissioner of Patents